US010250309B2

(12) United States Patent
Truong et al.

(10) Patent No.: US 10,250,309 B2
(45) Date of Patent: Apr. 2, 2019

(54) SYSTEM AND METHOD FOR DOWNLINK CHANNEL ESTIMATION IN MASSIVE MULTIPLE-INPUT-MULTIPLE-OUTPUT (MIMO)

(71) Applicant: Huawei Technologies Co., Ltd., Shenzhen (CN)

(72) Inventors: Kien Trung Truong, Hanoi (VN); Peiying Zhu, Kanata (CA); Jianglei Ma, Ottawa (CA); Robert Wendell Heath, Jr., Austin, TX (US)

(73) Assignee: Huawei Technologies, Co., Ltd., Shenzhen (CN)

( * ) Notice: Subject to any disclaimer, the term of this patent is extended or adjusted under 35 U.S.C. 154(b) by 49 days.

(21) Appl. No.: 15/365,541

(22) Filed: Nov. 30, 2016

(65) Prior Publication Data

US 2017/0279508 A1    Sep. 28, 2017

Related U.S. Application Data

(60) Provisional application No. 62/312,850, filed on Mar. 24, 2016.

(51) Int. Cl.
| | | |
|---|---|---|
| *H04B 7/04* | (2017.01) | |
| *H04B 7/0456* | (2017.01) | |
| *H04B 7/06* | (2006.01) | |

(52) U.S. Cl.
CPC ......... *H04B 7/0469* (2013.01); *H04B 7/0626* (2013.01)

(58) Field of Classification Search
CPC . H04L 5/0053; H04L 5/0055; H04L 27/2636; H04L 5/0048; H04L 5/0007; H04L 5/001; H04L 1/1671; H04L 1/1861; H04L 5/0051; H04L 1/0026; H04L 27/2633; H04L 25/0242
See application file for complete search history.

(56) References Cited

U.S. PATENT DOCUMENTS 6,067,290 A  5/2000 Paulraj et al.
6,298,092 B1  10/2001 Heath, Jr. et al.
(Continued)

FOREIGN PATENT DOCUMENTS

CN  101960757 A  1/2011
CN  103685088 A  3/2014
(Continued)

*Primary Examiner* — Sai Aung
(74) *Attorney, Agent, or Firm* — Slater Matsil, LLP

(57) ABSTRACT

It is possible to reduce the overhead associated with downlink channel estimation in massive Multiple-Input-Multiple-Output (MIMO) networks by processing training sequences according to a transformation matrix. The transformation matrix maps a generic dictionary to a non-generic dictionary associated with an antenna geometry of a MIMO antenna array. The transformation matrix can be computed based on the two dictionaries. In one embodiment, the training reference signal is precoded to obtain a precoded training reference signal, which is then transmitted over a MIMO antenna array. The training precoder used to precode the training reference signal is designed according to the transformation matrix to mitigate a dependence that the training reference signal transmission has on the antenna geometry.

24 Claims, 16 Drawing Sheets

(56) References Cited

U.S. PATENT DOCUMENTS

| | | |
|---|---|---|
| 6,377,632 B1 | 4/2002 | Paulraj et al. |
| 6,377,636 B1 | 4/2002 | Paulraj et al. |
| 6,757,265 B1 | 6/2004 | Sebastian et al. |
| 6,760,882 B1 | 7/2004 | Gesbert et al. |
| 6,850,498 B2 | 2/2005 | Heath et al. |
| 6,937,592 B1 | 8/2005 | Heath, Jr. et al. |
| 7,058,146 B2 | 6/2006 | Paulraj et al. |
| 7,191,381 B2 | 3/2007 | Gesbert et al. |
| RE40,056 E | 2/2008 | Heath, Jr. et al. |
| 7,328,033 B2 | 2/2008 | Rappaport et al. |
| 7,392,054 B2 | 6/2008 | Cho et al. |
| 7,486,931 B2 | 2/2009 | Cho et al. |
| 7,586,873 B2 | 9/2009 | Heath, Jr. et al. |
| 7,599,420 B2 | 10/2009 | Forenza et al. |
| 7,606,204 B2 | 10/2009 | Sebastian et al. |
| 7,633,994 B2 | 12/2009 | Forenza et al. |
| 7,636,381 B2 | 12/2009 | Forenza et al. |
| 7,649,868 B2 | 1/2010 | Heath et al. |
| 7,676,007 B1 | 3/2010 | Choi et al. |
| 7,693,100 B2 | 4/2010 | Cho et al. |
| 7,761,775 B2 | 7/2010 | Gesbert et al. |
| 7,773,564 B2 | 8/2010 | Heath, Jr. et al. |
| 7,778,147 B2 | 8/2010 | Forenza et al. |
| 7,809,330 B2 | 10/2010 | Cho et al. |
| 7,921,349 B2 | 4/2011 | Gesbert et al. |
| 8,050,618 B2 | 11/2011 | Kwun et al. |
| 8,130,862 B2 | 3/2012 | Forenza et al. |
| 8,135,349 B2 | 3/2012 | Hwang et al. |
| 8,160,121 B2 | 4/2012 | Forenza et al. |
| 8,165,533 B2 | 4/2012 | Heath, Jr. et al. |
| 8,190,209 B2 | 5/2012 | Ko et al. |
| 8,200,212 B2 | 6/2012 | Rappaport et al. |
| 8,204,142 B2 | 6/2012 | Hwang et al. |
| 8,217,835 B2 | 7/2012 | Ko et al. |
| 8,233,926 B2 | 7/2012 | Heath et al. |
| 8,284,863 B2 | 10/2012 | Hwang et al. |
| 8,306,146 B2 | 11/2012 | Heath, Jr. et al. |
| 8,339,934 B2 | 12/2012 | Heath, Jr. et al. |
| 8,345,637 B2 | 1/2013 | Heath et al. |
| 8,418,033 B2 | 4/2013 | Gesbert et al. |
| 8,428,037 B2 | 4/2013 | Heath, Jr. et al. |
| 8,428,162 B2 | 4/2013 | Forenza et al. |
| 8,514,913 B2 | 8/2013 | Heath, Jr. et al. |
| 8,565,331 B2 | 10/2013 | Panah et al. |
| 8,638,874 B2 | 1/2014 | Heath, Jr. et al. |
| 9,654,264 B2 * | 5/2017 | Athley .................. H04L 5/0048 |
| 2001/0020917 A1 * | 9/2001 | Hamada .................... G01S 1/38 |
| | | 342/442 |
| 2004/0204111 A1 * | 10/2004 | Ylitalo .................. H04W 16/28 |
| | | 455/562.1 |
| 2010/0074358 A1 * | 3/2010 | Khojastepour ..... H04L 25/0204 |
| | | 375/267 |
| 2011/0064152 A1 | 3/2011 | Okino |
| 2013/0230081 A1 * | 9/2013 | Wernersson ......... H04B 7/0617 |
| | | 375/219 |
| 2013/0272263 A1 | 10/2013 | Pi et al. |
| 2013/0321207 A1 * | 12/2013 | Monogioudis .......... H01Q 1/246 |
| | | 342/373 |
| 2014/0269502 A1 * | 9/2014 | Forenza ................ H04B 17/12 |
| | | 370/328 |
| 2016/0094324 A1 | 3/2016 | Lee et al. |

FOREIGN PATENT DOCUMENTS

| | | |
|---|---|---|
| CN | 104579443 A | 4/2015 |
| CN | 105359426 A | 2/2016 |

\* cited by examiner

US 10,250,309 B2

SYSTEM AND METHOD FOR DOWNLINK CHANNEL ESTIMATION IN MASSIVE MULTIPLE-INPUT-MULTIPLE-OUTPUT (MIMO)

This patent application claims priority to U.S. Provisional Application No. 62/312,850, filed on Mar. 24, 2016 and entitled "System and Method for Downlink Channel Estimation in Massive Multiple-Input-Multiple-Output (MIMO)," which is hereby incorporated by reference herein as if reproduced in its entirety.

TECHNICAL FIELD

The present invention relates generally to managing the allocation of resources in a network, and in particular embodiments, to techniques and mechanisms for a system and method for downlink channel estimation in massive Multiple-Input-Multiple-Output (MIMO).

BACKGROUND

In massive Multiple-Input-Multiple-Output (MIMO) networks, base stations are typically equipped with relatively greater numbers of antenna elements than base stations in conventional MIMO networks. The greater number of antenna elements enables the energy of the beamformed transmissions to be focused into smaller regions of space, thereby providing enhanced throughput and radiated energy efficiency. This, in turn, allows for lower transmit power levels and reduced multiuser processing complexity.

Despite these advantages, massive MIMO brings about some new challenges not faced by conventional MIMO networks. One such challenge relates to a base station's acquisition of state information of the downlink channels between itself and its associated user equipment (UEs). In conventional MIMO networks, the UEs estimate the downlink channel coefficients based on training sequences sent by the base station and then send the estimated channel state information (CSI) to the base station. This approach, however, may result in significant overhead in massive MIMO networks because training sequence transmissions and channel state information feedback are proportional to the number of antennas at the base station. Another approach in MIMO networks configured for time division duplex (TDD) operation assumes there is channel reciprocity between uplink and downlink channels. This assumption allows the base station to estimate a downlink channel response based on uplink pilot signal transmissions from the UEs, thereby avoiding the large overhead of downlink training sequence transmission and explicit CSI feedback. However, channel reciprocity may not be a reliable assumption in massive MIMO systems for various reasons, such as hardware performance limitations and/or calibration errors in time division duplexed (TDD) massive MIMO uplink/downlink channel configurations, as well as frequency selective fading in frequency division duplexed (FDD) massive MIMO uplink/downlink channel configurations. As a result, some level of downlink training sequence transmission and CSI feedback may be required to support massive MIMO networks. Techniques for reducing overhead related to downlink training sequence transmission and CSI feedback in massive MIMO networks are therefore desired.

SUMMARY

Technical advantages are generally achieved by embodiments of this disclosure which describe a system and method for VNF termination management.

In accordance with an embodiment, a method for massive multiple-input-multiple-output (MIMO) channel estimation is provided. In this example, the method includes precoding a training reference signal according to a training precoder obtain a precoded training reference signal, and transmitting the precoded reference signal over a MIMO antenna array of a base station. The training precoder is based on a transformation matrix that maps a generic dictionary to a non-generic dictionary associated with an antenna geometry of the MIMO antenna array of the base station. The method further includes processing a received channel estimate in accordance with the transformation matrix to obtain a complex channel response associated with a downlink channel between the MIMO antenna array and a user equipment (UE). In an embodiment, the received channel estimate is a sparse channel estimate corresponding to the downlink channel. Precoding the training reference signal according to a training precoder may serve to compensate for an effect that the antenna geometry of the MIMO antenna array has on signals transmitted over the MIMO antenna array. In some embodiments, the method further includes precoding a downlink signal according to a downlink precoder to obtain a precoded downlink signal, and transmitting the precoded downlink signal over MIMO antenna array to the UE. The downlink precoder may be based on the non-generic dictionary. In some embodiments, the generic dictionary is associated with a uniform linear array (ULA) antenna geometry, and the MIMO antenna array of the base station has a non-ULA antenna geometry. In such embodiments, the MIMO antenna array of the base station may have a uniform rectangular array (URA) antenna geometry, a uniform circular array antenna geometry, or a uniform cylindrical array antenna geometry. An apparatus for performing this method is also provided.

In accordance with another embodiment, another method for massive MIMO channel estimation is provided. In this example, the method includes sending an identifier associated with a transformation matrix to a user equipment (UE) transmitting a training reference signal over a MIMO antenna array of a base station to the UE. The transformation matrix is a priori information to the UE. The method further includes processing a channel estimate in accordance with the transformation matrix to obtain a complex channel response associated with a downlink channel between the MIMO antenna array and the UE. The channel estimate is generated from the training reference signal according to the transformation matrix In some embodiments, the transformation matrix maps a generic dictionary to a non-generic dictionary associated with an antenna geometry of the MIMO antenna array of the base station. An apparatus for performing this method is also provided.

BRIEF DESCRIPTION OF THE DRAWINGS

For a more complete understanding of the present disclosure, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
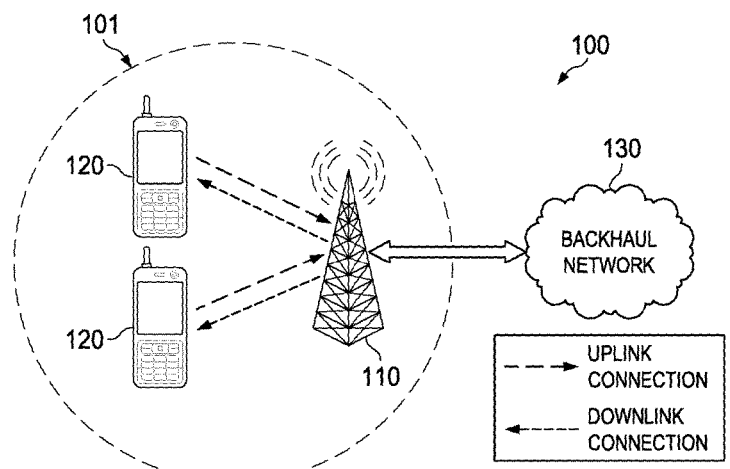
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In a massive multiple-input multiple-output (MIMO) system, a compressed sensing (CS) based channel estimation method may be used to estimate a downlink (DL) channel from a base station (BS) to a user equipment (UE). This approach takes advantage of the sparse nature of massive MIMO channels, which allows a given massive MIMO channel to be represented by a sparse channel estimate (i.e., vector of coefficients that include a few non-zero value coefficients interspersed between zero-value coefficients). A sparse channel estimate may include more zero value entries than non-zero entries. In some instances, a sparse channel estimate includes many more zero value entries than non-zero entries. For example, an s-sparse channel vector $h \in C^{N_t \times 1}$ has s non-zero entries, where $N_t$ is the number of antennas of a BS, and $s << N_t$. Generally, a sparse structure of a channel is hidden and may be revealed through a representation based on a dictionary, such as h=gD, where h is a channel vector, $g \in C^{N \times 1}$ is an s-sparse vector ($s << N_t \leq N$), and $D \in C^{N_t \times N}$ is the dictionary. When the dictionary D is known, the channel vector h may be estimated based on the sparse vector g calculated and the dictionary D. When the dictionary D has an orthonormal basis (e.g., $N=N_t$), it is referred to as a sparsifying dictionary. In some examples, the dictionary D may not be orthonormal and may be over-complete with $N_t < N$. A directly exposed sparse channel vector h may be viewed as a hidden one where D is an identity matrix with size $N_t \times N_t$.

According to the CS based channel estimation method, the UE estimates a sparse DL channel vector (g) based on a set of training sequences (also known as pilot signals) received from the base station and a dictionary D. The sparse DL channel vector is then used to estimate the complex channel response. The dictionary D is a redundant basis that is designed based on the antenna geometry of the MIMO antenna array of the base station. In conventional MIMO networks, the UE is generally required to know the dictionary in order to estimate the sparse DL channel vector.

Dictionaries are designed based on the antenna geometry of the base station. In conventional MIMO networks, base stations typically include uniform linear array (ULA) antennas, where the antenna elements are in-line with one another with near-uniform spacing between adjacent elements. However, base stations in massive MIMO networks may adopt a different antenna geometry in order to satisfy physical design limitations, e.g., so that the antenna array does not exceed a length constraint. This may affect dictionary design, which is heavily influenced by antenna geometry. By way of example, a dictionary design for a ULA antenna may be ill-suited for a uniform rectangular array (URA) antenna.

To further complicate matters, different base stations may use different non-ULA antenna configurations to perform massive MIMO transmissions. For instance, one base station may utilize a URA antenna to perform massive MIMO downlink transmission, and another base station may utilize a uniform circular array antenna to perform massive MIMO downlink transmissions. This may increase the overhead required for downlink channel estimation, because conventional dictionary-based channel estimation techniques may require that UEs know which dictionary is being used by the base station when processing the downlink training sequence.

One solution would be for the base station to communicate the corresponding dictionary to the UE prior to transmitting the training sequence over the massive MIMO antenna array. However, this may significantly increase the overhead associated with the downlink channel estimation, particularly when larger dictionaries are used.

Embodiments provided herein reduce the overhead associated with downlink channel estimation in massive MIMO networks by processing training sequences according to a transformation matrix. The transformation matrix maps a generic dictionary to a non-generic dictionary associated with an antenna geometry of a MIMO antenna array of the base station. Accordingly, the transformation matrix can be computed based on the two dictionaries. In one embodiment, the base station precodes the training reference signal to obtain a precoded training reference signal, which is then transmitted to a user equipment (UE) over a MIMO antenna array of the base station. The training precoder used to precode the training reference signal is designed according to the transformation matrix to mitigate a dependence that the training reference signal transmission has on the antenna geometry. In one example, the training precoder can be selected as the pseudo-inverse of the transformation matrix. The base station then receives a sparse channel estimate from the UE, and processes the sparse channel estimate in accordance with the transformation matrix to obtain a complex channel response of a downlink channel between the MIMO antenna array of the base station and the UE. In another embodiment, the base station transmits an index of the transformation matrix to the UE, and the UE uses the transformation matrix to process a training reference signal received from the base station and obtain a sparse channel estimate. The sparse channel estimate is then fed back to the base station, where it is processed according to the transformation matrix to obtain a complex channel response of a downlink channel between the MIMO antenna array of the base station and the UE. The base station designs a data precoder based on the knowledge of the obtained complex downlink channel response to transmit downlink signals over the MIMO antenna array to the UE.

FIG. 1 illustrates a network 100 for communicating data. The network 100 comprises a base station 110 having a coverage area 101, a plurality of mobile devices 120, and a backhaul network 130. As shown, the base station no establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
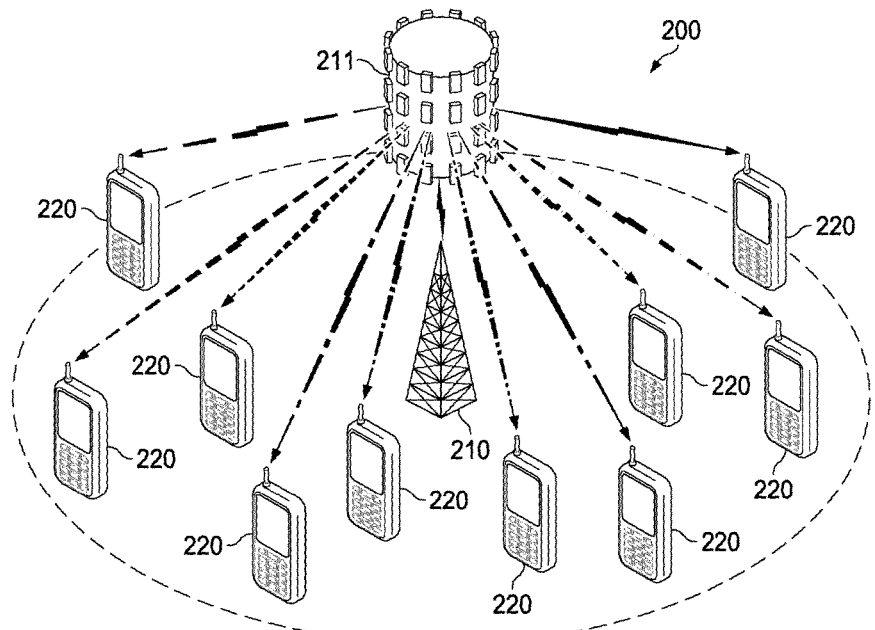
FIG. 2 is a block diagram of a massive MIMO network.
Figure 3:
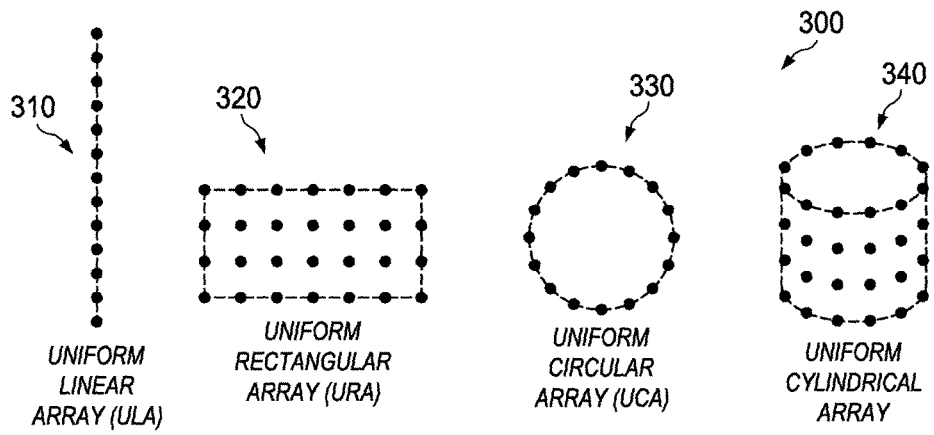
FIG. 3 is a diagram of different antenna geometries.

FIG. 2 illustrates a block diagram of a massive MIMO network 200 in which a base station 210 provides wireless access to a plurality of UEs 220. The base station 210 may communicate wireless signals over an antenna array 211 having a non-ULA antenna geometry. FIG. 3 is a diagram of different antenna geometries, including a ULA geometry 310, a URA geometry 320, a uniform circular array geometry 330, and a uniform cylindrical array geometry 340. Other antenna array geometries are also possible.

Figure 4:
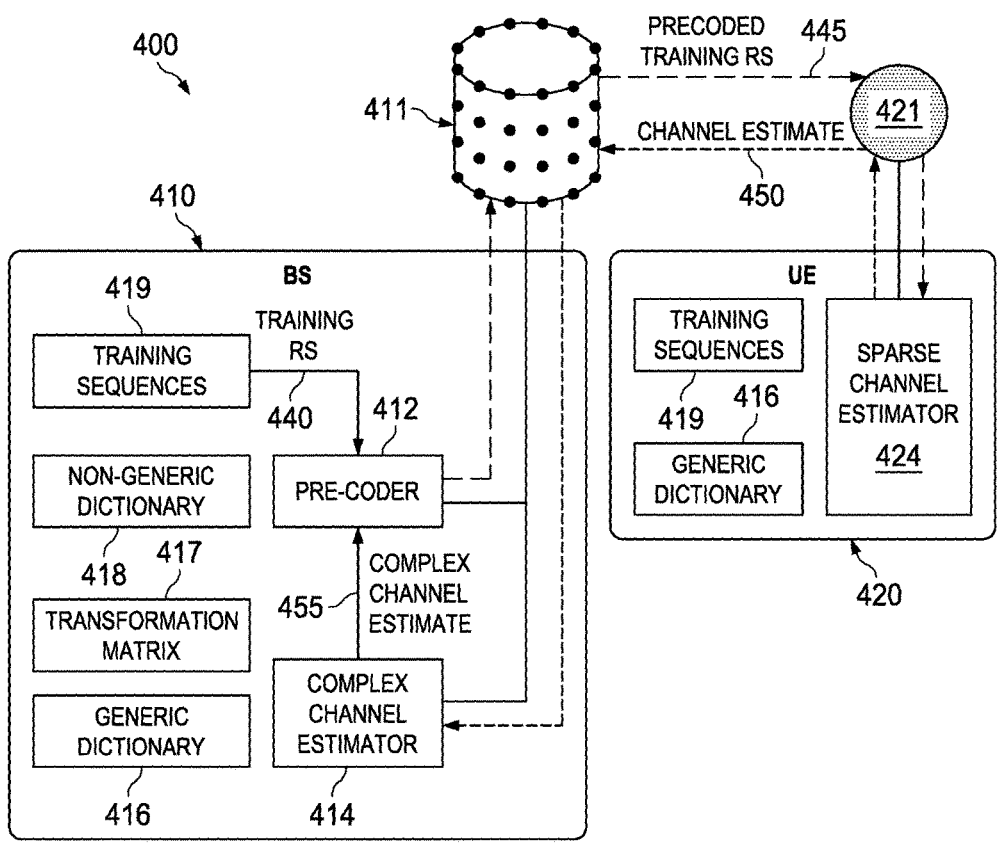
FIG. 4 is a protocol diagram of an embodiment communications sequence for achieving downlink channel estimation with reduced overhead.

Embodiments of this disclosure reduce the overhead associated with downlink channel estimation in massive MIMO networks by processing training sequences according to a transformation matrix. FIG. 4 is a protocol diagram of an embodiment communications sequence 400 for downlink channel estimation with reduced overhead, as may be performed by a base station 410 and a UE 420. The base station 410 includes an antenna array 411, a precoder 412, and a complex channel estimator 414. The antenna array 411 includes a plurality of antenna elements arranged in accordance with a non-ULA antenna geometry, such as a URA, uniform circular array, or uniform cylindrical array geometry. The precoder 412 may include any components, or collection of components, adapted to manipulate the phase and/or magnitude of a signal to obtain a precoded signal. In addition, the base station may store a generic dictionary 416, a transformation matrix 417, a non-generic dictionary 418, and training sequences 419. The generic dictionary 416 may include a generic set of codewords and is based on a generic antenna geometry. In an embodiment, the generic dictionary 416 is associated with a ULA antenna geometry. The non-generic dictionary 418 may include a non-generic set of codewords, and may be based on the antenna geometry of the antenna array 411. The transformation matrix 417 may be computed based on the generic dictionary 416 and the non-generic dictionary 418, and may include precoders that compensate for an effect that the antenna geometry of the antenna array 411 has on signals transmitted over the antenna array 411.

The UE 420 includes an antenna 421 and a sparse channel estimator 424. The antenna 421 may include any component, or combination of components, adapted to receive and/or transmit wireless signals with the base station 410. The sparse channel estimator 424 may be any component, or combination of components, adapted to generate a channel estimate based on a reference signal received over the antenna 421. The UE 420 may further store the generic dictionary 416 and the training sequences 419, both of which may be a priori information of the UE 420.

In this example, the base station 410 generates a training reference signal 440 based on the training sequences, and precodes the training reference signal according to the transformation matrix 417 to generate a precoded training reference signal 445, which is transmitted over the antenna array 411 to a UE u 420. Upon reception, the UE u 420 processes the precoded training reference signal 445 to obtain a sparse channel estimate 450, which is then transmitted over the antenna 421 to the base station 410. The base station 410 may then process the sparse channel estimate 450 according to the generic dictionary 416 and the transformation matrix 417 to obtain a complex channel estimate 455, which is used to design a data precoder 418 to use for downlink data transmissions between the base station 410 and the UE 420.

A received training signal at the user equipment u in the case of a single cell may be represented by: $y_u^T = h_u^T (T^T)^{-1} P + v_u^T = g_u^T D_{G,u}^T P + v_u^T$ (Equation 1), where $h_u^T$ is a complex DL channel vector to be estimated by the UE u, T is the transformation matrix, P is a predefined training sequence matrix, $v_u^T$ is noise, $g_u^T$ is a sparse DL channel vector, $D_{G,u}^T$ is a pre-determined generic dictionary, and the superscript "$T$" represents the matrix transpose.

The UE 420 can perform compressed sensing (CS) DL channel estimation based on Equation (1) to estimate a sparse DL channel vector $\hat{g}_u$. In doing so, the UE 420 may first solve the following optimization problem:

$$\hat{g}_u = \min_{g \in C^{N \times 1}} \|g\|_0 \qquad \text{(Equation 2)}$$

$$\text{s.t. } \|y_u^T - g^T D_{G,u}^T P\|_2^2 \leq \varepsilon.$$

As mentioned above, the sparse channel estimate $\hat{g}_u$ 450 is reported by the UE 420 back to the base station 410. The base station computes an estimate of the DL channel vector $h_u$ based on the transformation matrix T, the generic dictionary $D_{G,u}$, and the sparse channel estimate $\hat{g}_u$ according to the following equation: $\hat{h}_u = TD_{G,u}\hat{g}_u$. The information of the generic dictionary $D_{G,u}$ and the training sequence matrix P may be known by the UE 420.

Figure 5:
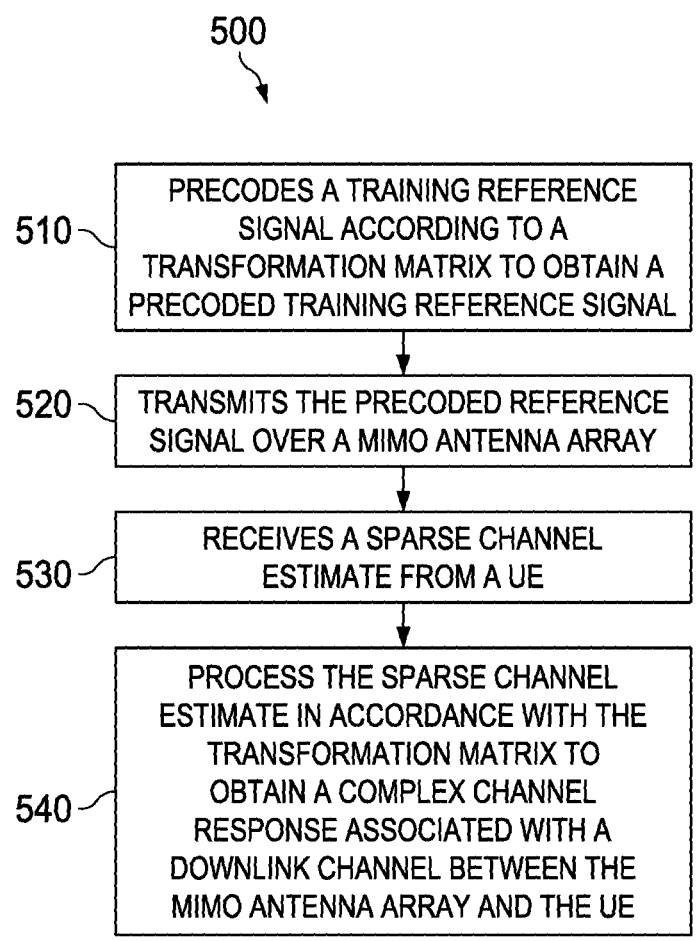
FIG. 5 is a flowchart of an embodiment method for achieving downlink channel estimation with reduced overhead.

FIG. 5 illustrates a flowchart of an embodiment method 500 for achieving downlink channel estimation with reduced overhead, as might be performed by a base station. At step 510, the base station precodes a training reference signal according to a transformation matrix to obtain a precoded training reference signal. At step 520, the base station transmits the precoded reference signal over a MIMO antenna array of the base station. The transformation matrix maps a generic dictionary to a non-generic dictionary associated with an antenna geometry of the MIMO antenna array. At step 530, the base station receives a sparse channel estimate from the UE. At step 540, the base station processes the sparse channel estimate in accordance with the transformation matrix to obtain a complex channel response associated with a downlink channel between the MIMO antenna array and the UE. In some embodiments, the base station may use the complex channel response to select codewords from the non-generic dictionary, and then use the selected codeword to precode downlink transmissions destined for the UE.

Figure 6:
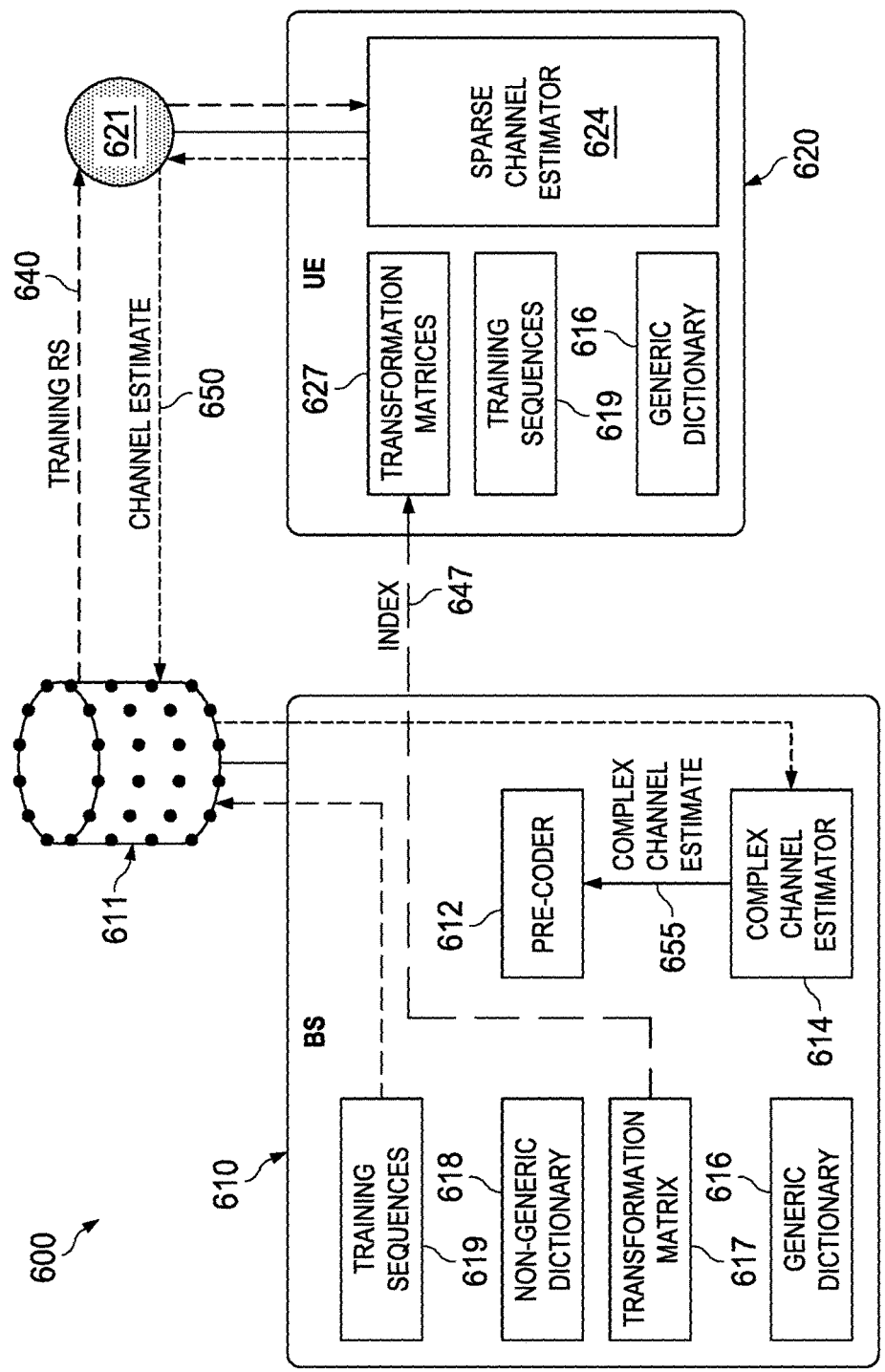
FIG. 6 is a protocol diagram of another embodiment communications sequence for achieving downlink channel estimation with reduced overhead.

In some embodiments, a UE processes a training reference signal received from a base station according to a transformation matrix to obtain a sparse channel estimate. FIG. 6 is a protocol diagram of an embodiment communications sequence 600 for achieving downlink channel estimation with reduced overhead, as may take place between a base station 610 and a UE 620. In this example, the base station 610 includes an antenna array 611, a precoder 612, and a complex channel estimator 614. In addition, the base station may store a generic dictionary 616, a transformation matrix 617, a non-generic dictionary 618, and training sequences 619. The antenna array 611, the precoder 612, the complex channel estimator 614, the generic dictionary 616, the transformation matrix 617, the non-generic dictionary 618, and the training sequences 619 may be configured similarly to like components in the base station 410 depicted in FIG. 4.

The UE 620 includes an antenna 621 and a sparse channel estimator 624. The antenna 621 and the sparse channel estimator 624 may be configured similarly to like components in the UE 420 depicted in FIG. 4. The UE 620 may further store the generic dictionary 616, training sequences 619, and a table of transformation matrices 627, each of which may be a priori information of the UE 620.

In this example, the base station 610 generates a training reference signal 640 based on the training sequences, which is transmitted over the antenna array 611 to the UE 620. The base station 610 also communicates an index 647 associated with the transformation matrix 617 to the UE 620. The index 647 may be communicated over the antenna array 611. Alternatively, the index 647 may be communicated over another interface, e.g., a low/high frequency interface, etc.

The table of transformation matrices 627 may associate a plurality of pre-defined transformation matrices with a plurality of indices. The UE 620 may identify a pre-defined transformation matrix associated with the index 647 in the table of transformation matrices 627, and process the received training reference signal 640 according to the identified transformation matrix to obtain a sparse channel estimate 650.

The UE 620 may then transmit the sparse channel estimate 650 over the antenna 621 to the base station 610. The base station 610 may then process the sparse channel estimate 650 according to the generic dictionary 616 and the transformation matrix 617 to obtain a complex channel estimate 655, which is used to design a data precoder 612 to use for downlink data transmissions between the base station 610 and the UE 620.

In this embodiment, a received training signal at the UE 620 in case of a single-cell may be represented by the following equation: $y_u^T = h_u^T P + v_u^T = g_u^T D_{G,u}^T T^T P + v_u^T$ (Equation 3), where $h_u^T$ is a complex DL channel vector to be estimated by the UE 620, T is the transformation matrix, P is a predefined training sequence matrix, $v_u^T$ is noise, $g_u^T$ is a sparse DL channel vector, $D_{G,u}^T$ is a pre-determined generic dictionary, and the superscript "$T$" represents the matrix transpose.

The UE 620 can perform compressed sensing (CS) DL channel estimation based on Equation 3 to estimate a sparse DL channel vector $\hat{g}_u$. In doing so, the UE 620 may solve the following optimization problem:

$$\hat{g}_u = \min_{g \in C^{N \times 1}} \|g\|_0 \qquad \text{(Equation 4)}$$
$$\text{s.t. } \|y_u^T - g^T D_{G,u}^T T_m^T P\|_2^2 \le \varepsilon,$$

where $T_m$ is the transformation matrix selected by the UE 620 based on the index m received from the base station.

As mentioned above, the sparse channel estimate $\hat{g}_u$ 450 is reported by the UE 620 back to the base station 610. The base station 610 computes an estimate of the DL channel vector $h_u$ based on the transformation matrix T, the generic dictionary $D_{G,u}$, and the sparse channel estimate $\hat{g}_u$ according to the following equation: $\hat{h}_u = TD_{G,u}\hat{g}_u$. The generic dictionary $D_{G,u}$, the index m of the transformation matrix, and the training sequence matrix P may be known by the UE 620.

Figure 7:
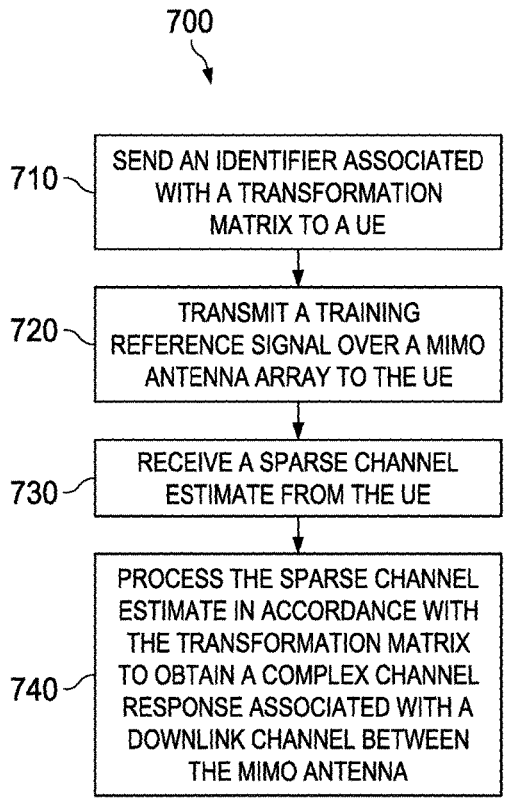
FIG. 7 is a flowchart of another embodiment method for achieving downlink channel estimation with reduced overhead.

FIG. 7 illustrates a flowchart of an embodiment method 700 for downlink channel estimation, as might be performed by a base station. At step 710, the base station sends an identifier associated with a transformation matrix to a UE. At step 720, the base station transmits a training reference signal over a MIMO antenna array to the UE. At step 730, the base station receives a channel estimate from the UE. At step 740, the base station processes the sparse channel estimate in accordance with the transformation matrix to obtain a complex channel response associated with a downlink channel between the MIMO antenna array and the UE. In some embodiments, the base station may use the complex channel response to select or design a data precoder, and then use it to precoded downlink transmissions destined for the UE.

Figure 8:
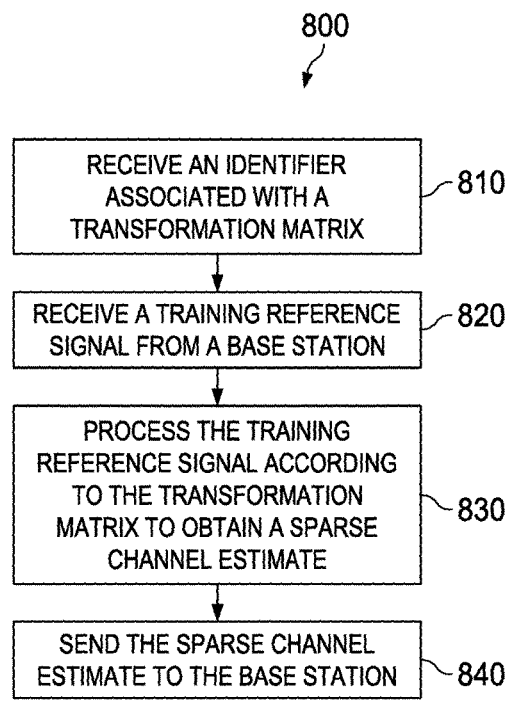
FIG. 8 is a flowchart of yet another embodiment method for achieving downlink channel estimation with reduced overhead.

FIG. 8 illustrates a flowchart of an embodiment method 800 for downlink channel estimation, as might be performed by a UE. At step 810, the UE receives an identifier associated with a transformation matrix. At step 820, the UE receives a training reference signal from a base station. At step 830, the UE processes the training reference signal according to the transformation matrix to obtain a sparse channel estimate. At step 840, the UE sends the sparse channel estimate to the base station.

Figure 9:
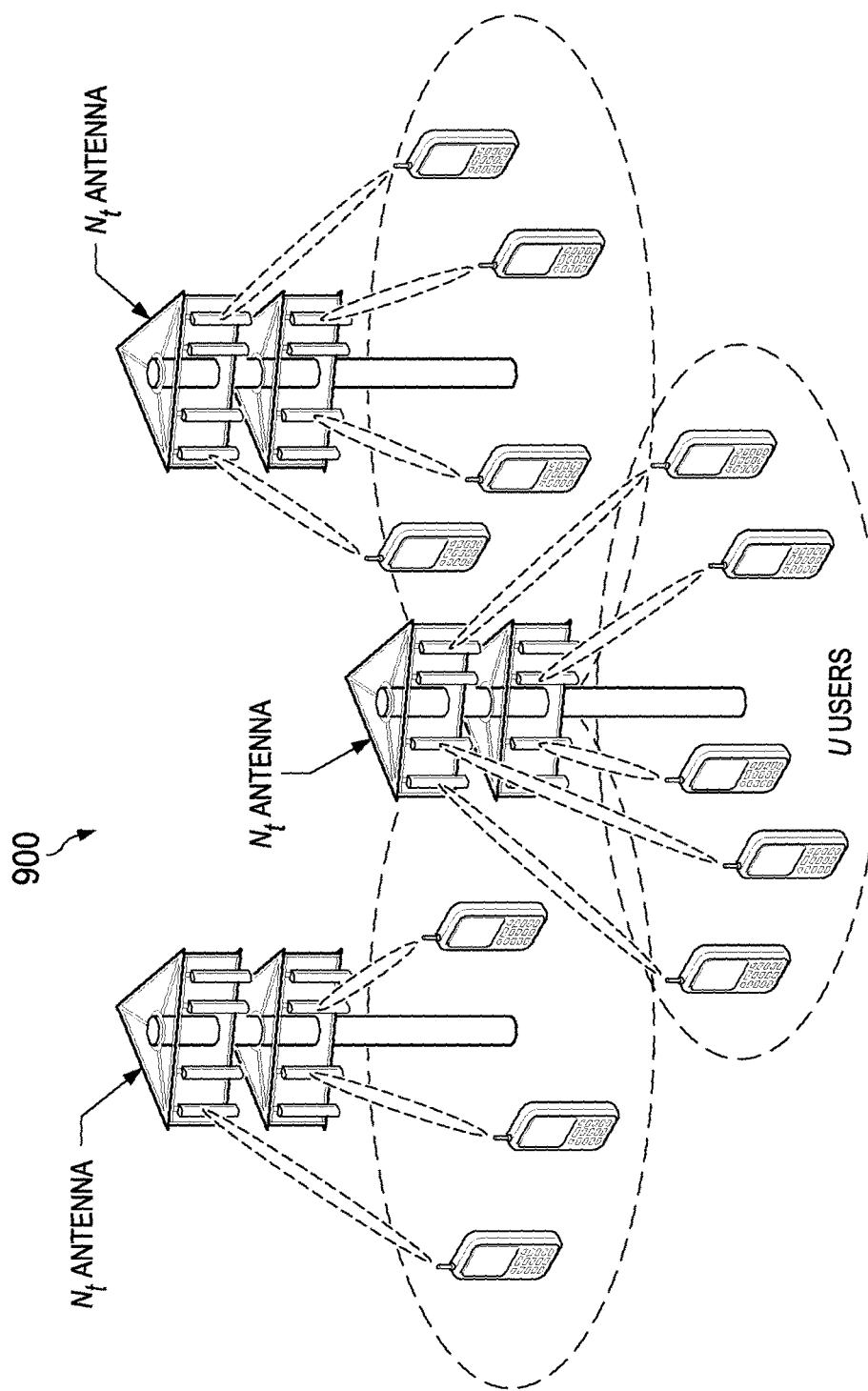
FIG. 9 is a diagram of a multi-cell multiuser massive MIMO network.

FIG. 9 illustrates a frequency division duplexed (FDD) massive MIMO network 900 where base stations (BSs) serve UEs in corresponding cells. Each BS has an antenna array with $N_t$ elements. Each UE has a single antenna. The number of antennas at each BS may exceed the number of UEs served by the base station. In this example, the network operates in the frequency division duplex (FDD) mode with two non-overlapping frequency carriers, one of which is dedicated for uplink (UL) transmissions and the other for downlink (DL) transmissions. Base stations and UEs may be synchronized in time and frequency.

A physical finite scatterering channel model may be used to evaluate massive MIMO networks. The channel model assumes that there are a finite number of active scatterers that are observed by both the base station and each of the UEs. The model may be used to characterize the low-rank property of the combined channel matrix between the base station and the UEs when the number of antennas at the base station and the number of UEs grow large, and the number of scatterers visible to the array grows at a lower rate. P represents the number of active paths. P is independent of $N_t$ or U, and may be dependent primarily on the physical propagation environment. In this setting, the downlink channel vector from the base station to UE u is $h_{f,u} \in \mathbb{C}^{N_t \times 1}$, with $$h_{f,u} = \frac{1}{\sqrt{P}} \sum_{p=1}^{P} \beta_{f,u,p} a_f(\phi_{f,p}), \qquad (1)$$

where $\beta_{f,u,p}$ is the complex gain of the $p^{th}$ ray, and $a_f(\phi_{f,p})$ are the transmit array steering vectors evaluated at the angle of departure (AoD) corresponding to each ray. This downlink channel vector can be approximated using an extended virtual channel representation to obtain $h_{f,u}^T \approx (h_v^u)^T A_f^*$, (2), where $h_v^u \in \mathbb{C}^{N_t \times 1}$ contains the path gains of the quantized spatial frequencies, and $A_f = [a_f(\phi_{f,1}) a_f(\phi_{f,2}) \ldots a_f(\phi_{f,N_t})] \in \mathbb{C}^{N_t \times N_t}$ contains the transmit array steering vectors evaluated on a uniform grid for the AoD. When $N_t$ grows large, the downlink virtual channel vectors $h_v^u$ are in general sparse because, due to limited scattering, the number of antennas is much larger than the number of active paths. In this model, each downlink channel may have a different sparsity level.

Configuration of the precoder at the BS may be based on downlink CSI for one or more UEs. Conventional channel estimation strategies for FDD MIMO systems require a training overhead proportional to the number of base station antennas. Embodiments of this disclosure reduce training overhead, without assuming a partially common support between the different downlink channels or knowledge of the BS array geometry at the UE.

In order to estimate the downlink channel, the BS may broadcast L pilot symbols in $Z \in \mathbb{C}^{N_t \times L}$, so that the UE can estimate the corresponding instantaneous downlink CSI. The received training signal at the u-th UE can be expressed as follows: $y_u^T = (h_v^u)^T A_f^* X + n_u^T$ (3) where $n_u$ is the noise vector and $X \in \mathbb{C}^{N_t \times L}$ is the transmitted training signal, which may be obtained as X=FZ using a training precoder $F \in \mathbb{C}^{N_t \times L}$. The optimization problem to be solved to obtain the downlink channel at UE u can be formulated as $$\min_{h_v^u} \|y_u^T - (h_v^u)^T A_f^* FZ\|_F. \qquad (4)$$

If the precoder and the BS array geometry were known at the UE, and using that the virtual downlink channel is a sparse vector, a CS-based solution to this problem could be derived. One LS solution to this problem may be expressed as $(h_v^u)^T = y_u^T Z^\dagger$ if the precoder and the BS array geometry were known at the UE. This may require relatively high training overhead. To enable downlink channel estimation at the UE side without knowledge of the BS array and the training precoder, embodiments of this disclosure use inverse manifold precoding during the training phase. In this way, the training precoding matrix may be defined as $F=(A_f^{-1})^*$, (5), where * stands for the conjugate transpose. With this training precoder, it is possible to formulate the following compressed sensing problem with noise data to estimate the sparse downlink channels from the received signals:

$$\min_{h_v^u} \|h_v^u\|_1$$

subject to $\|y_u^T - (h_v^u)^T Z\|_2 \leq \sigma$, (6), where $\sigma$ bounds the amount of noise in $y_u$. This optimization problem can be efficiently solved using different sparse recovery algorithms such as orthogonal matching pursuit (OMP). The estimation of the sparsity level could be done while estimating the channel by thresholding the residue in the OMP algorithm.

In regards to design of the pilot symbols, successful recovery of the sparse $h_v^u$ in (6) may depend upon the choice of the recovery algorithm used and the properties of the training sequence Z. To recover all s-sparse signals, the training sequence may need to be highly incoherent. A well-known result states that to recover all s-sparse signals the training matrix may satisfy:

$$s \leq \frac{1}{2}\left(1 + \frac{1}{\mu(Z^T)}\right), \qquad (7),$$

where $\mu(Z^T)$ is the maximum coherence between any of the distinct rows of Z. Increasing the number of the training symbols can lead to reductions in the coherence and therefore better recovery guarantees. In fact, recovery of s sparse vectors can be guaranteed with relatively high probability when $m \sim O(\mu(Z^T)^2 s \log_2(N_t))$ (8). The size of the pilot symbols may depend on the sparsity. Therefore, reliable recovery of the path gains can be achieved with relatively low overhead. If the sparsity is unknown, the recovery error in noisy circumstances may be reduced on average, over all sparsity levels, by unit norm tight frames.

Figure 10:
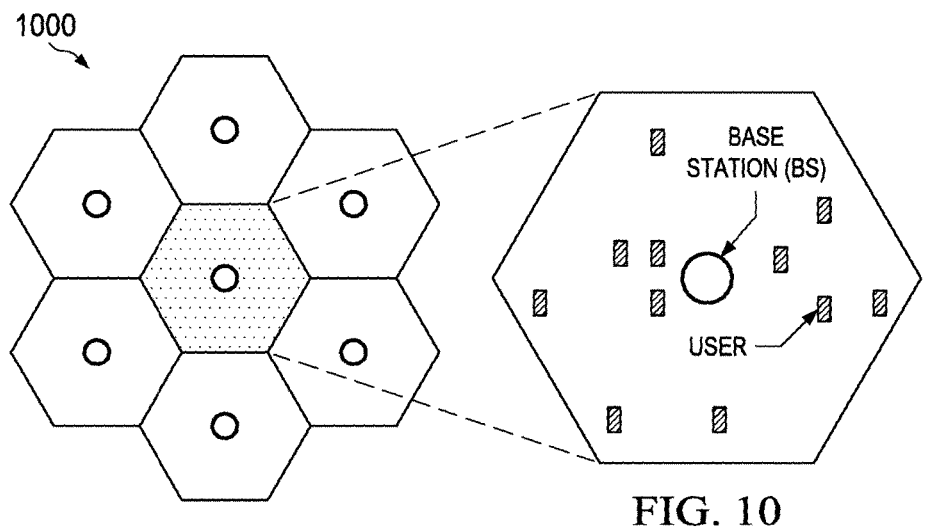
FIG. 10 is a diagram of an FDD multi-cell massive MIMO system used to obtain simulation results provided herein.

Achievable sum-rates for the downlink channels is another metric for evaluating the influence of the different algorithms in the final performance of the massive MIMO system. Both, normalized and unnormalized achievable sum rates are analyzed. The unnormalized sum rate does not account for the effects of training length, and is defined as $$v_u = \sum_{u=1}^{U} \log_2(1 + SINR_u),$$

where $SINR_u$ is the signal-to-interference-plus-noise ratio at the u-th UE. The normalized achievable sum rate is defined as $$v_n = \frac{T-\tau}{T} v_u$$

where T is the frame length and $\tau$ is the training length. FIG. 10 is a diagram of a FDD multi-cell massive MIMO system 1000. As shown, the system includes seven hexagonal cells with $N_t$-antenna BSs and single-antenna UEs. A block fading frequency flat channel model is used to represent the system based on the simulation parameters provided in Table 1.

TABLE 1

| Parameters | Description |
| --- | --- |
| Inter-site distance | 500 m |
| Sectorization | Not considered |
| UE asignment | Each UE is served by the BS in the same cell |
| Downlink frequency carrier | 2 GHz |
| BS total Tx power | 40 Watts or 46 dBM |
| Pathloss model | 36.7 $\log_{10}$ (d) + 22.7 − 26 $\log_{10}$ (fc), where d > 0.035 km is trans. Distance in km, $f_c$ is freq. carrier in GHz |
| Thermal noise dennsity | −174 dBm/Hz |
| Penetration loss | 20 dB |
| BS noise figure | 5 dB |
| Shadowing model | Not considered |
| Coherence BW | 180 kHz |

Figure 11:
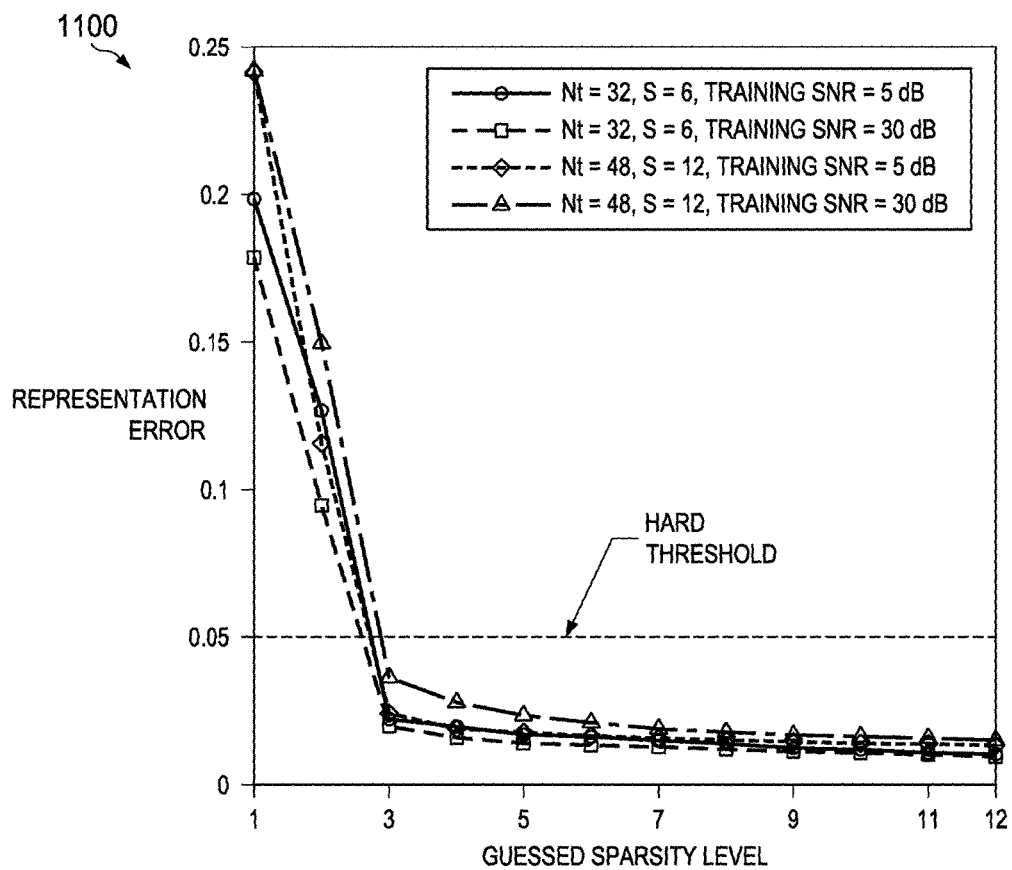
FIG. 11 is a graph of simulation results on sparsity level estimation.
Figure 12:
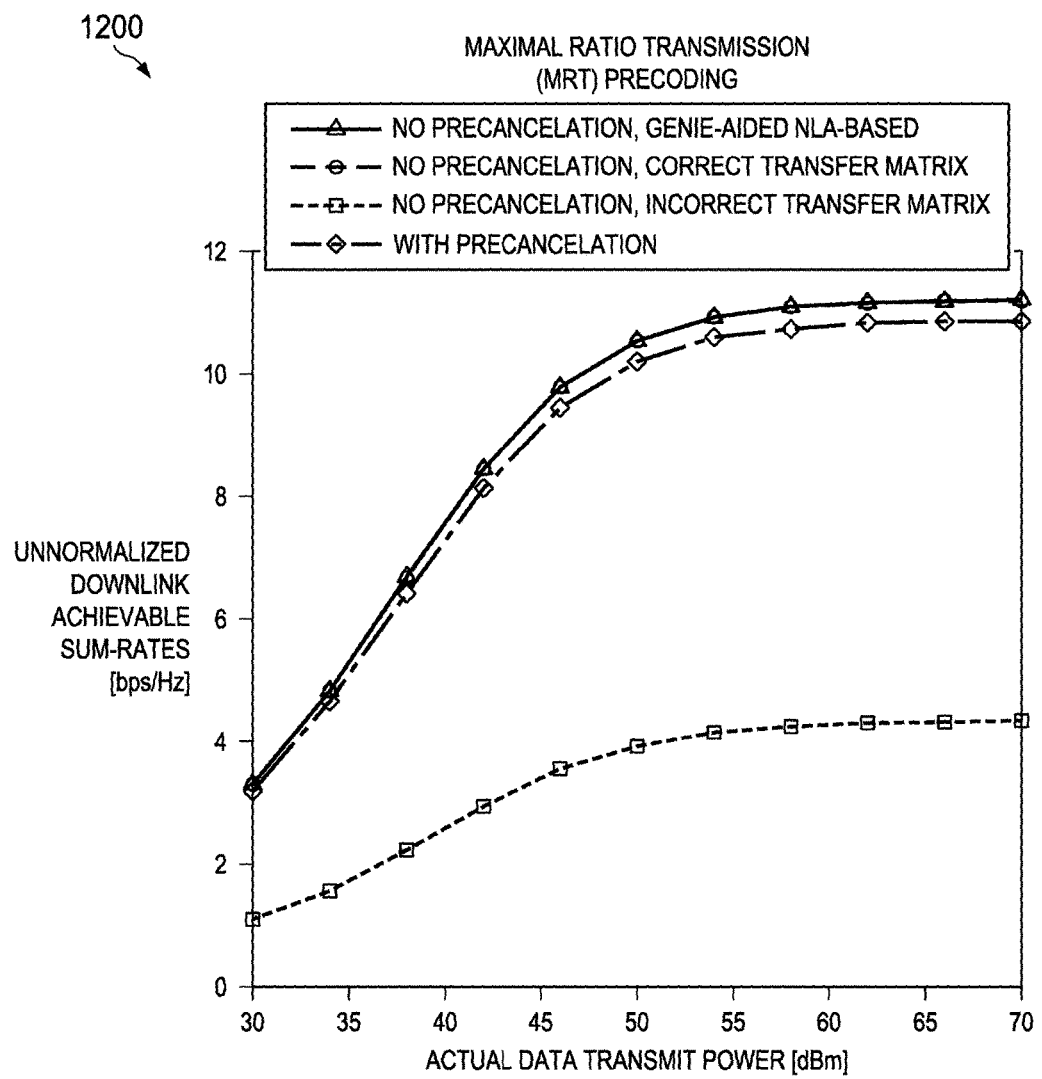
FIG. 12 is a graph of simulation results for different downlink channel estimation schemes.
Figure 13:
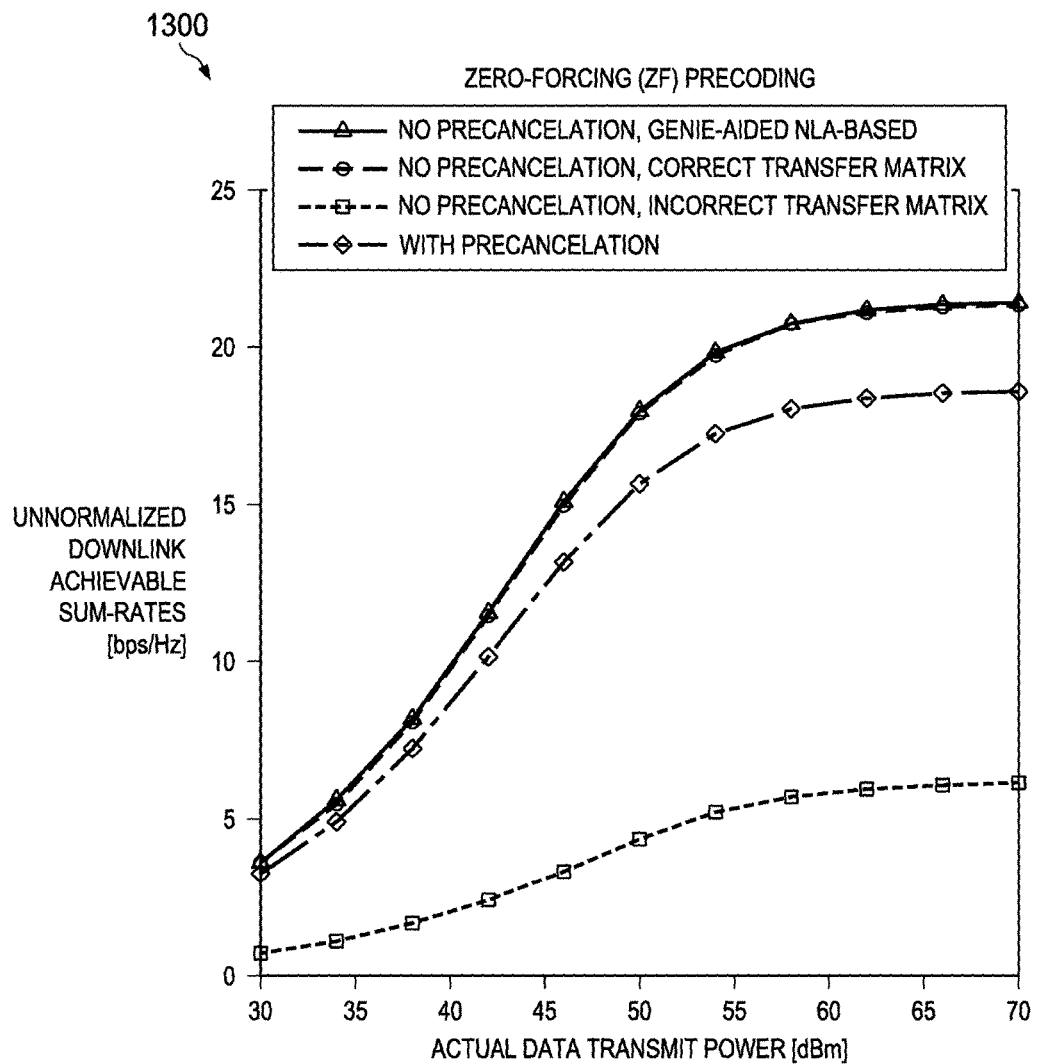
FIG. 13 is a graph of additional simulation results for different downlink channel estimation schemes.

In regards to estimation of the channel sparsity level, sparse recovery algorithms can be used to provide a sparsity level as an input parameter. For downlink channel estimation, the sparsity level represents the number of active paths in the downlink channel. This value may not be a priori information of the UE. FIG. 11 illustrates a graph 1100 showing estimated sparsity levels for different levels of error. As shown, the magnitude of the residual error in the channel estimation algorithm is a function of the sparsity level, the number of antennas, and the signal to noise ratio (SNR). FIGS. 12-15 illustrate simulation results for embodiment downlink channel estimation schemes provided herein. In particular, FIG. 12 illustrates a graph 1200 of sum-throughput rates at different transmit power levels when using maximal ratio transmission (MRT) precoder to perform downlink transmissions. FIG. 13 illustrates a graph 1300 of sum-throughput rates at different transmit power levels when using zero-forced (ZF) precoder to perform downlink transmissions. In both graphs 1200, 1300 the UE processed received training reference signals using the same transformation matrix. As shown, the embodiment downlink estimation scheme achieved similar sum-rate performance to genie-aided NLA-based schemes. Likewise, in both graphs 1200, 1300, an embodiment downlink estimation scheme in which the base station precoded the training reference signal according to the transformation matrix provided slightly lower sum-rate performance than the embodiment technique in which the UE processed a training reference signal using the transformation matrix.

Figure 14:
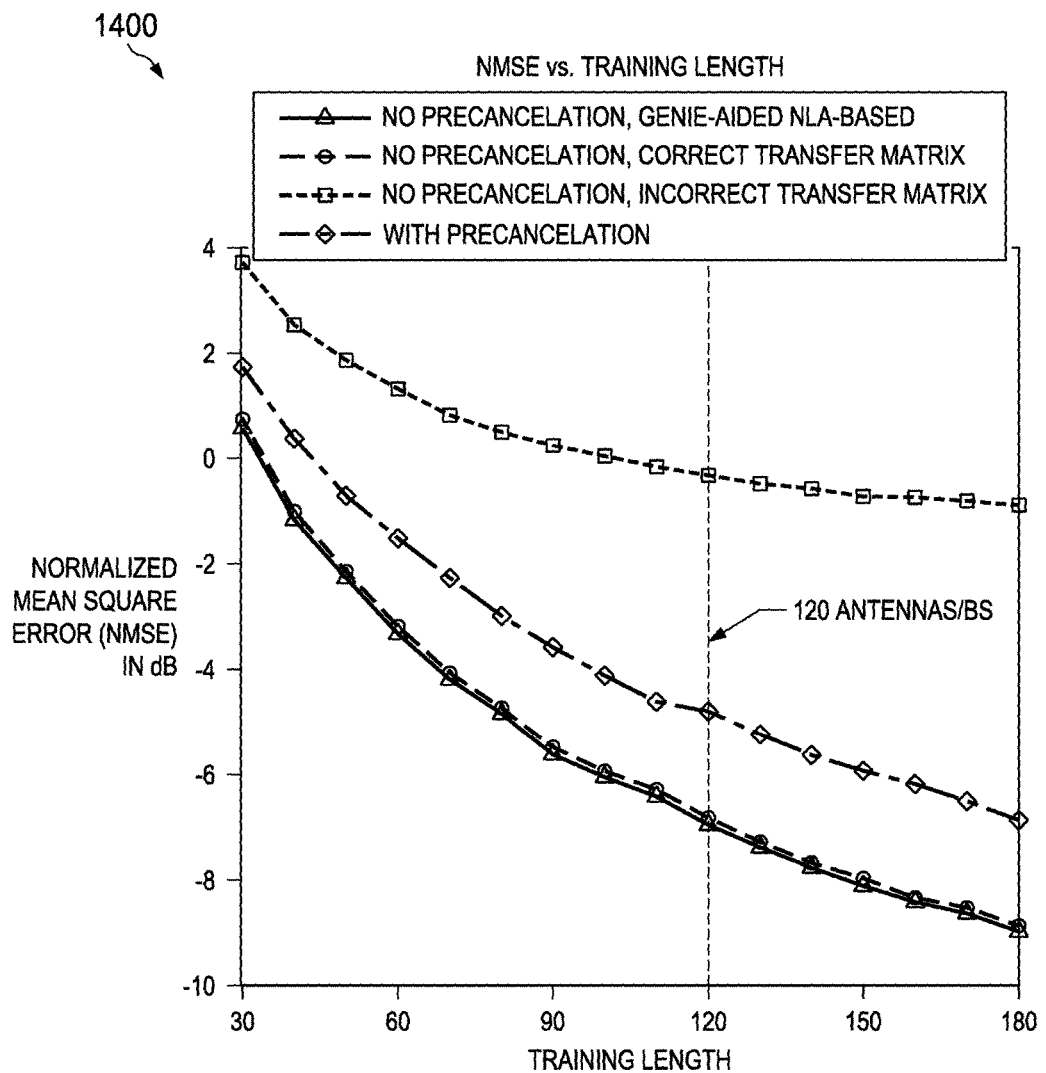
FIG. 14 is graph of yet additional simulation results for different downlink channel estimation schemes.
Figure 15:
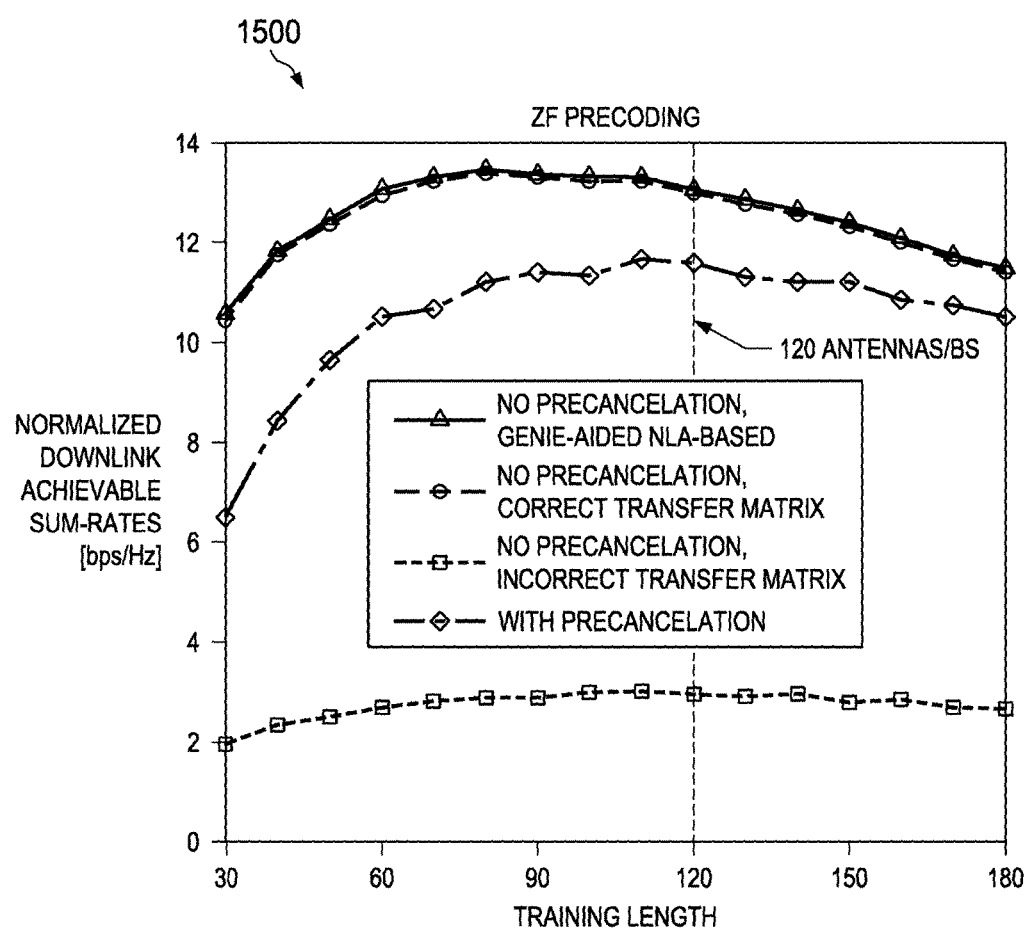
FIG. 15 is graph of yet additional simulation results for different downlink channel estimation schemes.

FIG. 14 illustrates a graph 1400 of normalized mean square error (NMSE) rates for different training sequence lengths. FIG. 15 illustrates a graph 1500 of normalized achievable sum-rates for different training sequence lengths. In both graphs 1400, 1500, an embodiment downlink estimation scheme in which the UE processed received training reference signals using the transformation matrix provided similar error rates to genie-aided NLA-based schemes. Likewise, in both graphs 1400, 1500, an embodiment downlink estimation scheme in which the base station precoded the training reference signal according to the transformation matrix to obtain a precoded training reference signal provided slightly worse error rate performance than the embodiment technique in which the UE processed the received training reference signal using the transformation matrix.

Figure 16:
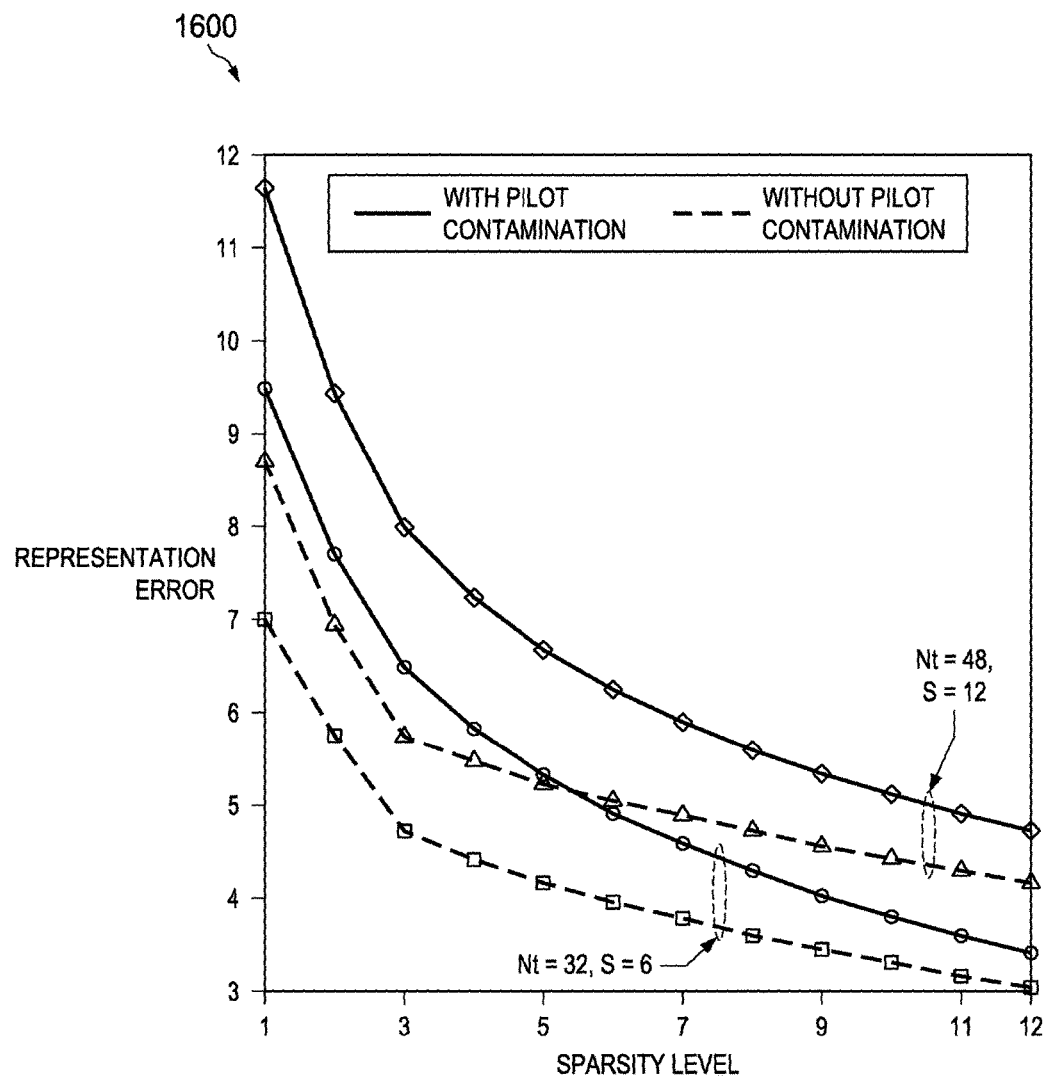
FIG. 16 is a graph of additional simulation results.

FIG. 16 illustrates a graph 1600 showing the magnitude of residual error versus estimated sparsity for a channel. The interference caused by plot contamination increases the magnitude of the residue of the sparse recovery algorithm. Thresholding may be used as a stop criterion for the iterative reconstruction algorithm.

Figure 17:
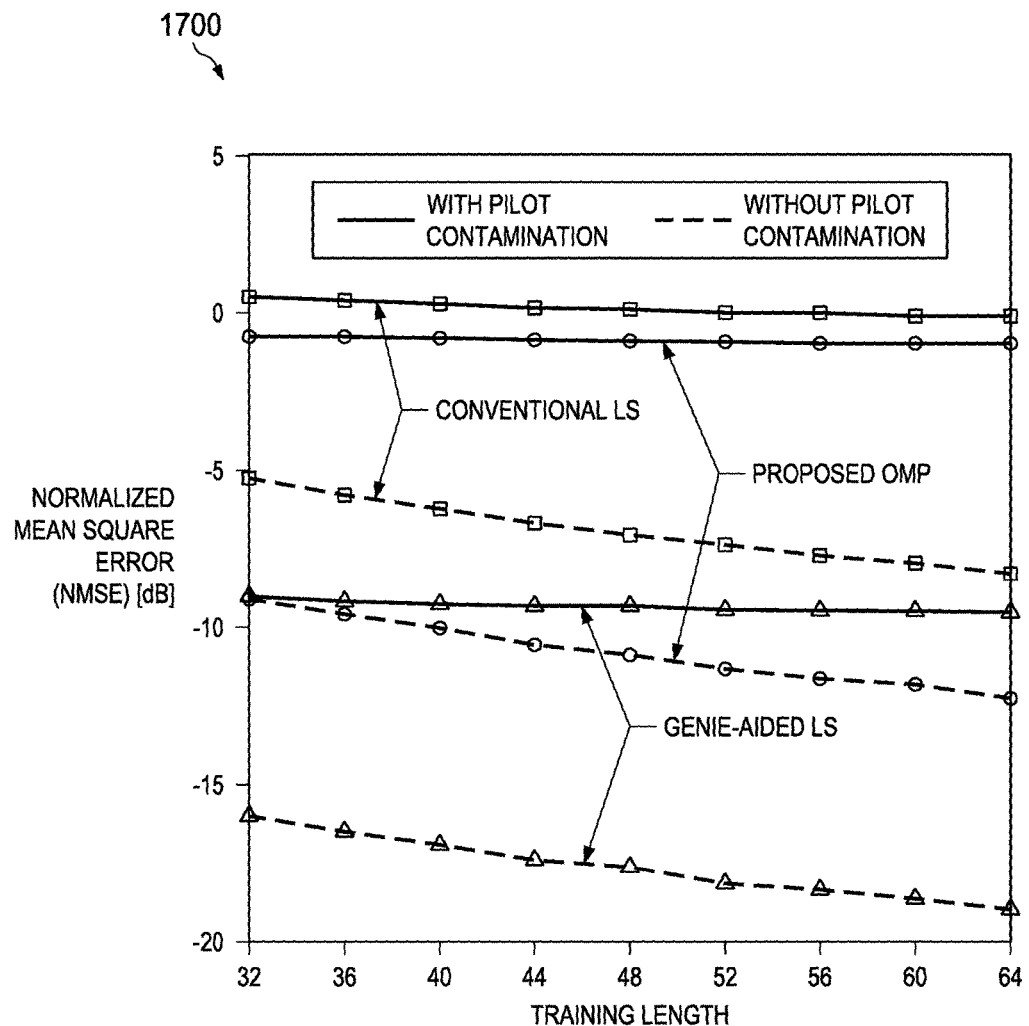
FIG. 17 is a graph of additional simulation results.

FIG. 17 is a graph 1700 showing the impact of training length on the NMSE with and without pilot contamination for $N_t$=32, U=6, and sparsity level in the channel equal to 6. The NMSE of the embodiment algorithm is compared to that of a least squares (LS) algorithm (with genie aided least squares). As shown, the conventional LS solution provides a lower bound on the performance of CS-based solutions because it does not exploit sparsity in the channel. The genie-aided LS solution assumes that the locations of non-zero entries are known so that only the path gains have to be computed. It provides an upperbound on performance of CS-based solutions. The embodiment algorithm outperforms the LS algorithm with and without pilot contamination. The LS algorithm needs more than twice the training length of the OMP-based solution to provide the same NMSE.

Figure 18:
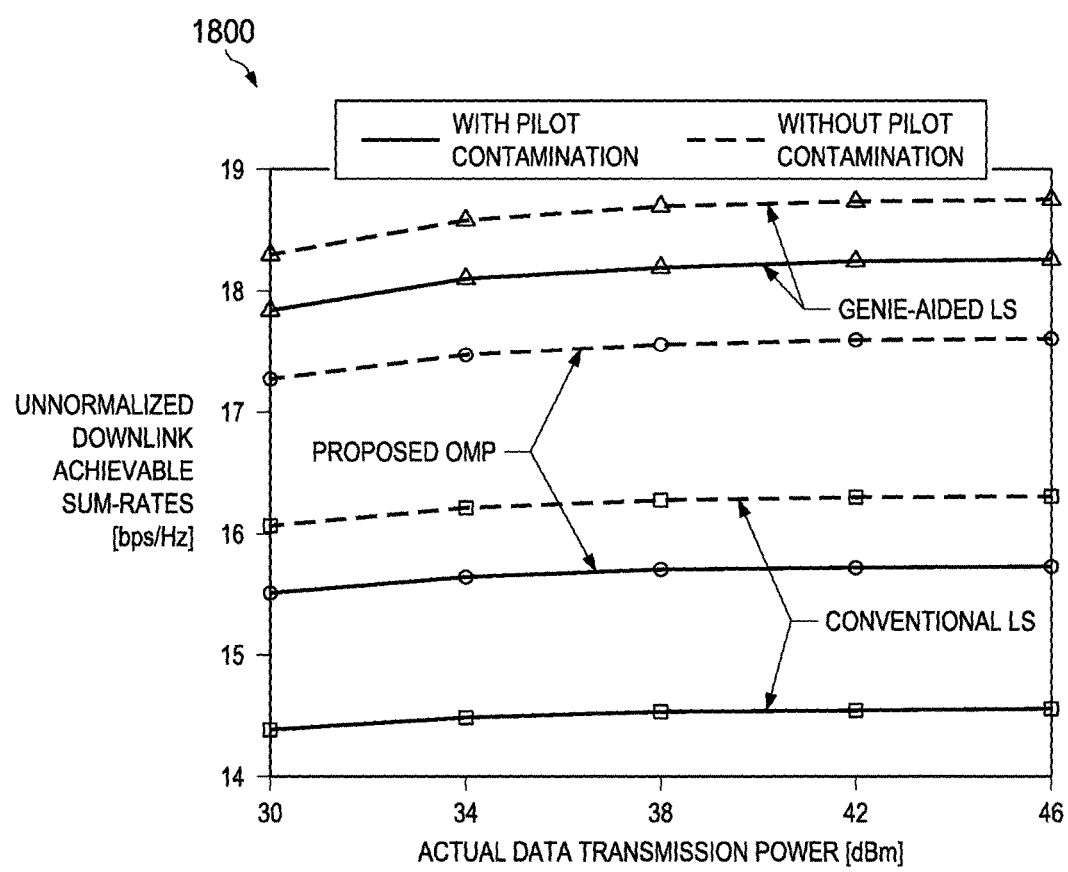
FIG. 18 is a graph of additional simulation results.

FIG. 18 is a graph 1800 showing unnormalized achievable sum-rate versus the transmitted power when downlink channels are estimated using an embodiment OMP-based algorithm, a LS algorithm, and a gene-aided LS algorithm for a training length equal to the number of BS antennas. The number of UEs per cell is set to 6 in this example. The OMP-based algorithm outperforms the LS algorithms with and without pilot contamination.

Figure 19:
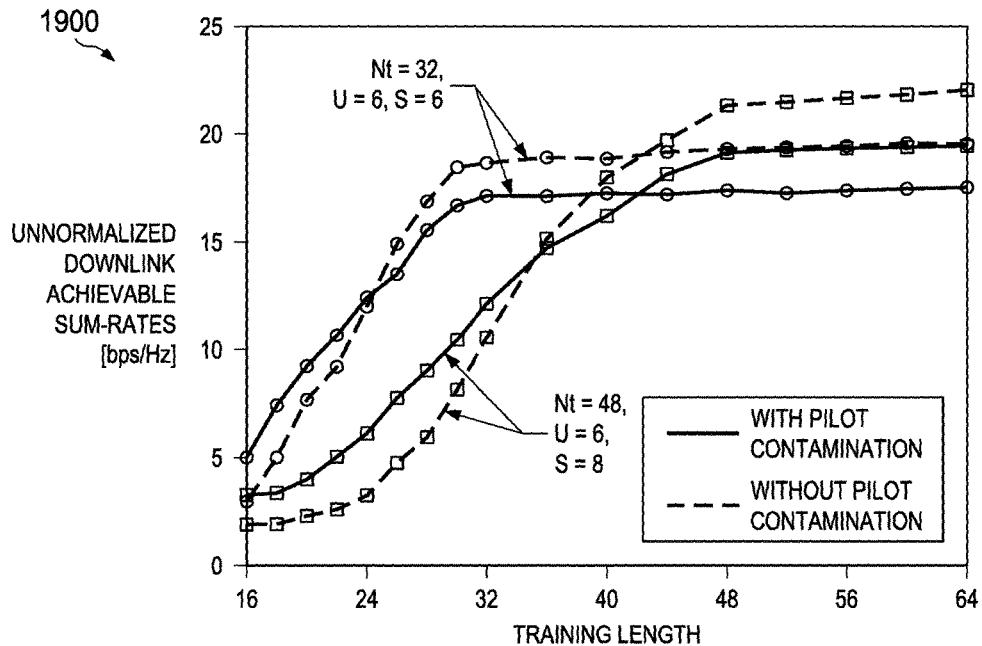
FIG. 19 is a graph of additional simulation results.
Figure 20:
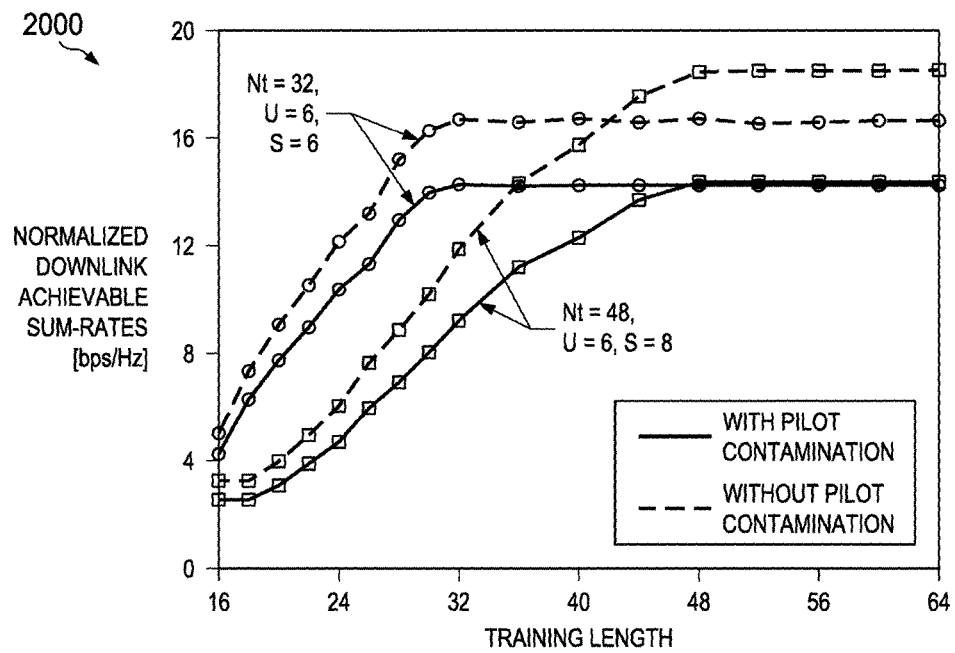
FIG. 20 is a graph of additional simulation results.

FIG. 19 is a graph 1900 that shows the impact of training length on the achievable unnormalized sum-rates. In this example, $N_t$=32 and 48, and there are six UEs per cell. It can be clearly seen that the OMP-based algorithm becomes saturated with large training lengths. FIG. 20 is a graph 2000 that shows the negative effects of pilot contamination on normalized sum-rates.

Figure 21:
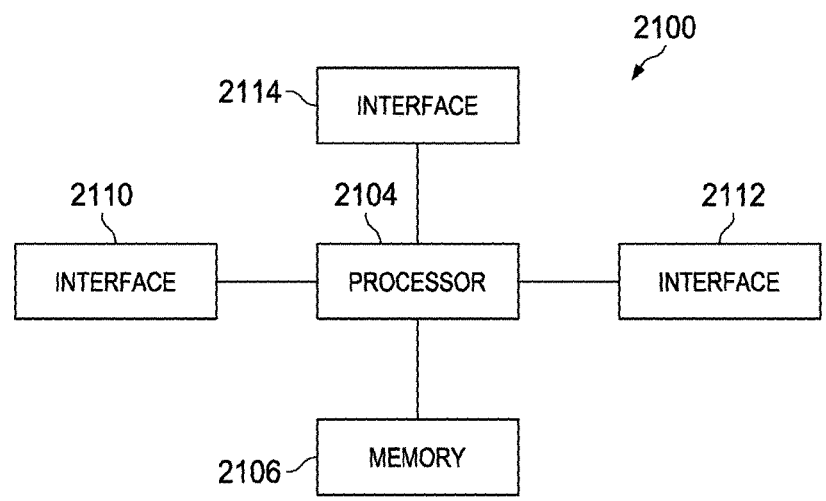
FIG. 21 is a diagram of an embodiment processing system.

FIG. 21 illustrates a block diagram of an embodiment processing system 2100 for performing methods described herein, which may be installed in a host device. As shown, the processing system 2100 includes a processor 2104, a memory 2106, and interfaces 2110-2114, which may (or may not) be arranged as shown in FIG. 21. The processor 2104 may be any component or collection of components adapted to perform computations and/or other processing related tasks, and the memory 2106 may be any component or collection of components adapted to store programming and/or instructions for execution by the processor 2104. In an embodiment, the memory 2106 includes a non-transitory computer readable medium. The interfaces 2110, 2112, 2114 may be any component or collection of components that allow the processing system 2100 to communicate with other devices/components and/or a user. For example, one or more of the interfaces 2110, 2112, 2114 may be adapted to communicate data, control, or management messages from the processor 2104 to applications installed on the host device and/or a remote device. As another example, one or more of the interfaces 2110, 2112, 2114 may be adapted to allow a user or user device (e.g., personal computer (PC), etc.) to interact/communicate with the processing system 2100. The processing system 2100 may include additional components not depicted in FIG. 21, such as long term storage (e.g., non-volatile memory, etc.).

In some embodiments, the processing system 2100 is included in a network device that is accessing, or otherwise part of, a telecommunications network. In one example, the processing system 2100 is in a network-side device in a wireless or wireline telecommunications network, such as a base station, a relay station, a scheduler, a controller, a gateway, a router, an applications server, or any other device in the telecommunications network. In other embodiments, the processing system 2100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 22:
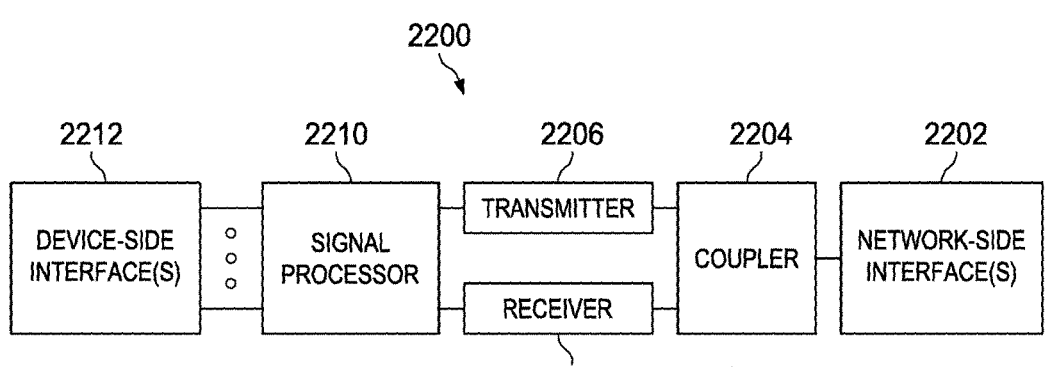
FIG. 22 is a diagram of an embodiment transceiver.

In some embodiments, one or more of the interfaces 2110, 2112, 2114 connects the processing system 2100 to a transceiver adapted to transmit and receive signaling over the telecommunications network. FIG. 22 illustrates a block diagram of a transceiver 2200 adapted to transmit and receive signaling over a telecommunications network. The transceiver 2200 may be installed in a host device. As shown, the transceiver 2200 comprises a network-side interface 2202, a coupler 2204, a transmitter 2206, a receiver 2208, a signal processor 2210, and a device-side interface 2212. The network-side interface 2202 may include any component or collection of components adapted to transmit or receive signaling over a wireless or wireline telecommunications network. The coupler 2204 may include any component or collection of components adapted to facilitate bi-directional communication over the network-side interface 2202. The transmitter 2206 may include any component or collection of components (e.g., up-converter, power amplifier, etc.) adapted to convert a baseband signal into a modulated carrier signal suitable for transmission over the network-side interface 2202. The receiver 2208 may include any component or collection of components (e.g., down-converter, low noise amplifier, etc.) adapted to convert a carrier signal received over the network-side interface 2202 into a baseband signal. The signal processor 2210 may include any component or collection of components adapted to convert a baseband signal into a data signal suitable for communication over the device-side interface(s) 2212, or vice-versa. The device-side interface(s) 2212 may include any component or collection of components adapted to communicate data-signals between the signal processor 2210 and components within the host device (e.g., the processing system 2100, local area network (LAN) ports, etc.).

The transceiver 2200 may transmit and receive signaling over any type of communications medium. In some embodiments, the transceiver 2200 transmits and receives signaling over a wireless medium. For example, the transceiver 2200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2202 comprises one or more antenna/radiating elements. For example, the network-side interface 2202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for massive multiple-input-multiple-output (MIMO) channel estimation, the method comprising:
    precoding, by a base station, a training reference signal according to a transformation matrix, the transformation matrix mapping a generic dictionary to a non-generic dictionary, the generic dictionary associated with a reference antenna geometry, the non-generic dictionary associated with an antenna geometry of a MIMO antenna array of the base station, the non-generic dictionary transforming a downlink channel between the MIMO antenna array and a user equipment (UE) into a sparse representation, the sparse representation of the downlink channel having non-zero coefficients interspersed between zero coefficients;
    transmitting, by the base station, the precoded training reference signal over the MIMO antenna array of the base station to the UE;
    receiving, by the base station, a sparse channel estimate from the UE, the sparse channel estimate being an estimate of the sparse representation of the downlink channel; and
    processing, by the base station, the received sparse channel estimate in accordance with the transformation matrix to obtain a complex channel estimate, the complex channel estimate being an estimate of the downlink channel.

2. The method of claim 1, wherein precoding the training reference signal according to the transformation matrix compensates for an effect that the antenna geometry of the MIMO antenna array has on signals transmitted over the MIMO antenna array.

3. The method of claim 1, further comprising:
    precoding a downlink signal according to a downlink precoder to obtain a precoded downlink signal, the downlink precoder based on the non-generic dictionary; and
    transmitting the precoded downlink signal over the MIMO antenna array to the UE.

4. The method of claim 1, wherein the generic dictionary is associated with a uniform linear array (ULA) antenna geometry, and wherein the MIMO antenna array of the base station has a non-ULA antenna geometry.

5. The method of claim 4, wherein the MIMO antenna array of the base station has a uniform rectangular array (URA) antenna geometry.

6. The method of claim 4, wherein the MIMO antenna array of the base station has a uniform circular array antenna geometry.

7. The method of claim 4, wherein the MIMO antenna array of the base station has a uniform cylindrical array antenna geometry.

8. An apparatus comprising:
a processor; and
a non-transitory computer readable storage medium storing programming for execution by the processor, the programming including instructions to:
precode a training reference signal according to a transformation matrix, the transformation matrix mapping a generic dictionary to a non-generic dictionary, the generic dictionary associated with a reference antenna geometry, the non-generic dictionary associated with an antenna geometry of a multiple-input-multiple-output (MIMO) antenna array of a base station, the non-generic dictionary transforming a downlink channel between the MIMO antenna array and a user equipment (UE) into a sparse representation, the sparse representation of the downlink channel having non-zero coefficients interspersed between zero coefficients;
transmit the precoded training reference signal over the MIMO antenna array of the base station to the UE;
receive a sparse channel estimate from the UE, the sparse channel estimate being an estimate of the sparse representation of the downlink channel; and
process the received sparse channel estimate in accordance with the transformation matrix to obtain a complex channel estimate, the complex channel estimate being an estimate of the downlink channel.

9. The apparatus of claim 8, wherein precoding the training reference signal according to a transformation matrix compensates for an effect that the antenna geometry of the MIMO antenna array has on signals transmitted over the MIMO antenna array.

10. The apparatus of claim 8, wherein the programming further includes instructions to:
precode a downlink signal according to a downlink precoder to obtain a precoded downlink signal, the downlink precoder based on the non-generic dictionary; and
transmit the precoded downlink signal over the MIMO antenna array to the UE.

11. The apparatus of claim 8, wherein the generic dictionary is associated with a uniform linear array (ULA) antenna geometry, and wherein the MIMO antenna array of the base station has a non-ULA antenna geometry.

12. The apparatus of claim 11, wherein the MIMO antenna array of the base station has a uniform rectangular array (URA) antenna geometry, a uniform circular array antenna geometry, or a uniform cylindrical array antenna geometry.

13. A method for massive multiple-input-multiple-output (MIMO) channel estimation, the method comprising:
sending, by a base station, an identifier associated with a transformation matrix to a user equipment (UE), the transformation matrix being a priori information to the UE and mapping a generic dictionary to a non-generic dictionary, the generic dictionary associated with a reference antenna geometry, the non-generic dictionary associated with an antenna geometry of a MIMO antenna array of the base station, the non-generic dictionary transforming a downlink channel between the MIMO antenna array and a UE into a sparse representation, the sparse representation of the downlink channel having non-zero coefficients interspersed between zero coefficients;
transmitting, by the base station, over the MIMO antenna array of the base station, a training reference signal to the UE;
receiving, by the base station, a sparse channel estimate from the UE, the sparse channel estimate being an estimate of the sparse representation of the downlink channel; and
processing, by the base station, the received sparse channel estimate in accordance with the transformation matrix to obtain a complex channel estimate, the complex channel estimate being an estimate of the downlink channel.

14. A base station comprising:
a processor; and
a non-transitory computer readable storage medium storing programming for execution by the processor, the programming including instructions to:
send, by the base station, an identifier associated with a transformation matrix to a user equipment (UE), the transformation matrix being a priori information to the UE and mapping a generic dictionary to a non-generic dictionary, the generic dictionary associated with a reference antenna geometry, the non-generic dictionary associated with an antenna geometry of a multiple-input-multiple-output (MIMO) antenna array of the base station, the non-generic dictionary transforming a downlink channel between the MIMO antenna array and a UE into a sparse representation, the sparse representation of the downlink channel having non-zero coefficients interspersed between zero coefficients;
transmit, over the MIMO antenna array of the base station, a training reference signal to the UE;
receive a sparse channel estimate from the UE, the sparse channel estimate being an estimate of the sparse representation of the downlink channel; and
process the received sparse channel estimate in accordance with the transformation matrix to obtain a complex channel estimate, the complex channel estimate being an estimate of the downlink channel.

15. A method for massive multiple-input-multiple-output (MIMO) channel estimation, the method comprising:
receiving, by a user equipment (UE), an identifier associated with a transformation matrix from a base station, the transformation matrix being a priori information to the UE and mapping a generic dictionary to a non-generic dictionary, the generic dictionary associated with a reference antenna geometry, the non-generic dictionary associated with an antenna geometry of a MIMO antenna array of the base station, the non-generic dictionary transforming a downlink channel between the MIMO antenna array and the UE into a sparse representation, the sparse representation of the downlink channel having non-zero coefficients interspersed between zero coefficients;
receiving, by the UE, a training reference signal from the base station;
processing the training reference signal according to the transformation matrix to obtain a sparse channel estimate, the sparse channel estimate being an estimate of the sparse representation of the downlink channel; and
sending the sparse channel estimate to the base station.

16. A user equipment (UE) comprising:
a processor; and
a non-transitory computer readable storage medium storing programming for execution by the processor, the programming including instructions to:
receive an identifier associated with a transformation matrix from a base station, the transformation matrix being a priori information to the UE and mapping a generic dictionary to a non-generic dictionary, the generic dictionary associated with a reference antenna geometry, the non-generic dictionary associated with an antenna geometry of a MIMO antenna array of the base station, the non-generic dictionary transforming a downlink channel between the MIMO antenna array and the UE into a sparse representation, the sparse representation of the downlink channel having non-zero coefficients interspersed between zero coefficients;

receive a training reference signal from the base station;

process the training reference signal according to the transformation matrix to obtain a sparse channel estimate, the sparse channel estimate being an estimate of the sparse representation of the downlink channel; and send the sparse channel estimate to the base station.

17. The method of claim 13, further comprising:

precoding a downlink signal according to a downlink precoder to obtain a precoded downlink signal, the downlink precoder based on the complex channel estimate; and transmitting the precoded downlink signal over the MIMO antenna array to the UE.

18. The method of claim 13, wherein the generic dictionary is associated with a uniform linear array (ULA) antenna geometry, and wherein the MIMO antenna array of the base station has a non-ULA antenna geometry.

19. The base station of claim 14, wherein the programming further includes instructions to:

precode a downlink signal according to a downlink precoder to obtain a precoded downlink signal, the downlink precoder based on the complex channel estimate; and transmit the precoded downlink signal over the MIMO antenna array to the UE.

20. The base station of claim 14, wherein the generic dictionary is associated with a uniform linear array (ULA) antenna geometry, and wherein the MIMO antenna array of the base station has a non-ULA antenna geometry.

21. The method of claim 15, wherein processing the training reference signal according to the transformation matrix to obtain the sparse channel estimate comprises performing a compressed sensing channel estimation.

22. The method of claim 15, wherein the generic dictionary is associated with a uniform linear array (ULA) antenna geometry, and wherein the MIMO antenna array of the base station has a non-ULA antenna geometry.

23. The UE of claim 16, wherein the instructions to process the training reference signal according to the transformation matrix to obtain the sparse channel estimate comprise instructions to perform a compressed sensing channel estimation.

24. The UE of claim 16, wherein the generic dictionary is associated with a uniform linear array (ULA) antenna geometry, and wherein the MIMO antenna array of the base station has a non-ULA antenna geometry.

* * * * *